(12) United States Patent  
Mashal

(10) Patent No.: US 11,982,035 B2  
(45) Date of Patent: May 14, 2024

(54) METHOD OF USING IMAGE RECOGNITION PROCESSES FOR IMPROVED OPERATION OF A LAUNDRY APPLIANCE

(71) Applicant: Haier US Appliance Solutions, Inc., Wilmington, DE (US)

(72) Inventor: Khalid Jamal Mashal, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 699 days.

(21) Appl. No.: 17/099,020

(22) Filed: Nov. 16, 2020

(65) Prior Publication Data

US 2022/0154381 A1 May 19, 2022

(51) Int. Cl.
| | |
|---|---|
| *D06F 33/44* | (2020.01) |
| *D06F 33/42* | (2020.01) |
| *D06F 34/18* | (2020.01) |
| *D06F 34/28* | (2020.01) |
| *D06F 37/26* | (2006.01) |
| *D06F 39/14* | (2006.01) |
| *D06F 103/04* | (2020.01) |
| *D06F 103/08* | (2020.01) |

(Continued)

(52) U.S. Cl.
CPC .............. *D06F 34/18* (2020.02); *D06F 33/42* (2020.02); *D06F 33/44* (2020.02); *D06F 34/28* (2020.02); *D06F 37/266* (2013.01); *D06F 39/14* (2013.01); *G06N 20/00* (2019.01); *G06V 20/60* (2022.01); *H04N 23/54* (2023.01); *D06F 2103/04* (2020.02); *D06F 2103/08* (2020.02); *D06F 2103/24* (2020.02); *D06F 2105/08* (2020.02); *D06F 2105/56* (2020.02); *D06F 2105/58* (2020.02)

(58) Field of Classification Search
None
See application file for complete search history.

(56) References Cited

U.S. PATENT DOCUMENTS

| 5,899,005 A | 5/1999 | Chen et al. |
| 8,522,452 B2 | 9/2013 | Ashrafzadeh et al. |

(Continued)

FOREIGN PATENT DOCUMENTS

| CN | 108088235 B | 10/2019 |
| KR | 20080053000 A | * 6/2008 |
| KR | 2019/0104948 A | 9/2019 |

*Primary Examiner* — Spencer E. Bell
*Assistant Examiner* — Omair Chaudhri
(74) *Attorney, Agent, or Firm* — Dority & Manning, P.A.

(57) ABSTRACT

A washing machine appliance includes a wash basket that is rotatably mounted within a wash tub and that defines a wash chamber for receiving a load of clothes. A basket speed sensor monitors the speed of the wash basket and a camera assembly is mounted within the wash tub for taking images of the load of clothes during and/or after a wash or rinse cycle. A controller determines the basket speed, adjusts a frame rate of the camera assembly to match the basket speed, obtains a still image from the camera assembly, analyzes the image using a machine learning image recognition process to determine a remaining moisture content (RMC) of the load of clothes, and adjusts at least one operating parameter of the washing machine appliance based on the remaining moisture content, e.g., such as ending the drain cycle when a target RMC is reached.

18 Claims, 5 Drawing Sheets

(51) Int. Cl.
  *D06F 103/24* (2020.01)
  *D06F 105/08* (2020.01)
  *D06F 105/56* (2020.01)
  *G06N 20/00* (2019.01)
  *G06V 20/60* (2022.01)
  *H04N 23/54* (2023.01)
  *D06F 105/58* (2020.01)

(56) References Cited

U.S. PATENT DOCUMENTS

| | | | | |
|---|---|---|---|---|
| 2012/0060299 | A1* | 3/2012 | Kim | D06F 34/18 68/12.04 |
| 2013/0312202 | A1* | 11/2013 | Balinski | D06F 34/18 8/137 |
| 2014/0326067 | A1* | 11/2014 | Chanda | D06F 33/34 73/32 R |
| 2017/0356115 | A1* | 12/2017 | Choi | D06F 34/28 |
| 2018/0066389 | A1* | 3/2018 | Wu | G05B 19/048 |
| 2018/0127910 | A1* | 5/2018 | Xu | D06F 33/36 |
| 2019/0024297 | A1* | 1/2019 | Gwon | D06F 33/34 |
| 2019/0093276 | A1* | 3/2019 | Hombroek | D06F 34/18 |
| 2019/0382941 | A1* | 12/2019 | Hwang | G06N 20/00 |
| 2020/0002868 | A1* | 1/2020 | Yang | D06F 33/37 |
| 2020/0002873 | A1 | 1/2020 | Chae et al. | |
| 2020/0063315 | A1* | 2/2020 | Yoon | G06F 18/214 |
| 2020/0248357 | A1* | 8/2020 | Koo | G05B 13/027 |
| 2020/0392660 | A1* | 12/2020 | Park | D06F 33/48 |
| 2021/0025097 | A1* | 1/2021 | Lee | G06V 20/52 |
| 2021/0131011 | A1* | 5/2021 | Park | D06F 33/30 |
| 2021/0148034 | A1* | 5/2021 | Park | D06F 33/32 |
| 2021/0164142 | A1* | 6/2021 | Ka | D06F 33/47 |
| 2021/0207304 | A1* | 7/2021 | Kim | D06F 39/00 |
| 2021/0332519 | A1* | 10/2021 | Park | D06F 39/088 |
| 2021/0334641 | A1* | 10/2021 | Kim | D06F 34/05 |
| 2021/0404103 | A1* | 12/2021 | Park | D06F 33/40 |
| 2022/0372684 | A1* | 11/2022 | Lee | D06F 39/085 |

\* cited by examiner

METHOD OF USING IMAGE RECOGNITION PROCESSES FOR IMPROVED OPERATION OF A LAUNDRY APPLIANCE

FIELD OF THE INVENTION

The present subject matter relates generally to washing machine appliances, or more specifically, to systems and methods for using image recognition processes to improve or optimize operation of washing machine appliances

BACKGROUND OF THE INVENTION

Washing machine appliances generally include a tub for containing water or wash fluid, e.g., water and detergent, bleach, and/or other wash additives. A basket is rotatably mounted within the tub and defines a wash chamber for receipt of articles for washing. During normal operation of such washing machine appliances, the wash fluid is directed into the tub and onto articles within the wash chamber of the basket. The basket or an agitation element can rotate at various speeds to agitate articles within the wash chamber, to wring wash fluid from articles within the wash chamber, etc. During a spin or drain cycle of a washing machine appliance, a drain pump assembly may operate to discharge water from within sump.

Notably, conventional washing machine appliances utilize open-ended or time-based drain cycles. In this regard, a drive motor attempts to rotate the wash basket at a target spin speed for a predetermined amount of time. However, certain conditions may result in the failure to reach and maintain the target spin speed, resulting in a drain cycle that fails to extract a suitable amount of water from a load of clothes. For example, out-of-balance loads, an inefficient or malfunctioning pump, or other frictional forces may result in an insufficient drain cycle. By contrast, certain conditions may result in spin and drain cycles where too much water is extracted from the load of clothes, resulting in wrinkles and unnecessarily lengthy cycle times. In either event, the load of clothes may have an undesirably high or low amount of residual water or moisture, referred to as the remaining moisture content (RMC).

Accordingly, a washing machine appliance with features for improved wash performance would be desirable. More specifically, a system and method for ensuring a load of washed clothes has a desirable remaining moisture content at the end of the drain cycle would be particularly beneficial.

BRIEF DESCRIPTION OF THE INVENTION

Advantages of the invention will be set forth in part in the following description, or may be apparent from the description, or may be learned through practice of the invention.

In one exemplary embodiment, a washing machine appliance is provided including a wash tub positioned within a cabinet, a wash basket rotatably mounted within the wash tub and defining a wash chamber configured for receiving of a load of clothes, a camera assembly mounted within the cabinet in view of the wash chamber, and a controller operably coupled to the camera assembly. The controller is configured to obtain the basket speed, obtain one or more images of the wash chamber using the camera assembly, the camera assembly operating at a frame rate that is equal to the basket speed, analyze the one or more images using a machine learning image recognition process to determine a remaining moisture content of the load of clothes, and adjust at least one operating parameter of the washing machine appliance based on the remaining moisture content.

In another exemplary embodiment, a method of operating a washing machine appliance is provided. The washing machine appliance includes a wash basket rotatably mounted within a wash tub and defining a wash chamber configured for receiving of a load of clothes, and a camera assembly mounted within the cabinet in view of the wash chamber. The method includes obtaining the basket speed, obtaining one or more images of the wash chamber using the camera assembly, the camera assembly operating at a frame rate that is equal to the basket speed, analyzing the one or more images using a machine learning image recognition process to determine a remaining moisture content of the load of clothes, and adjusting at least one operating parameter of the washing machine appliance based on the remaining moisture content.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
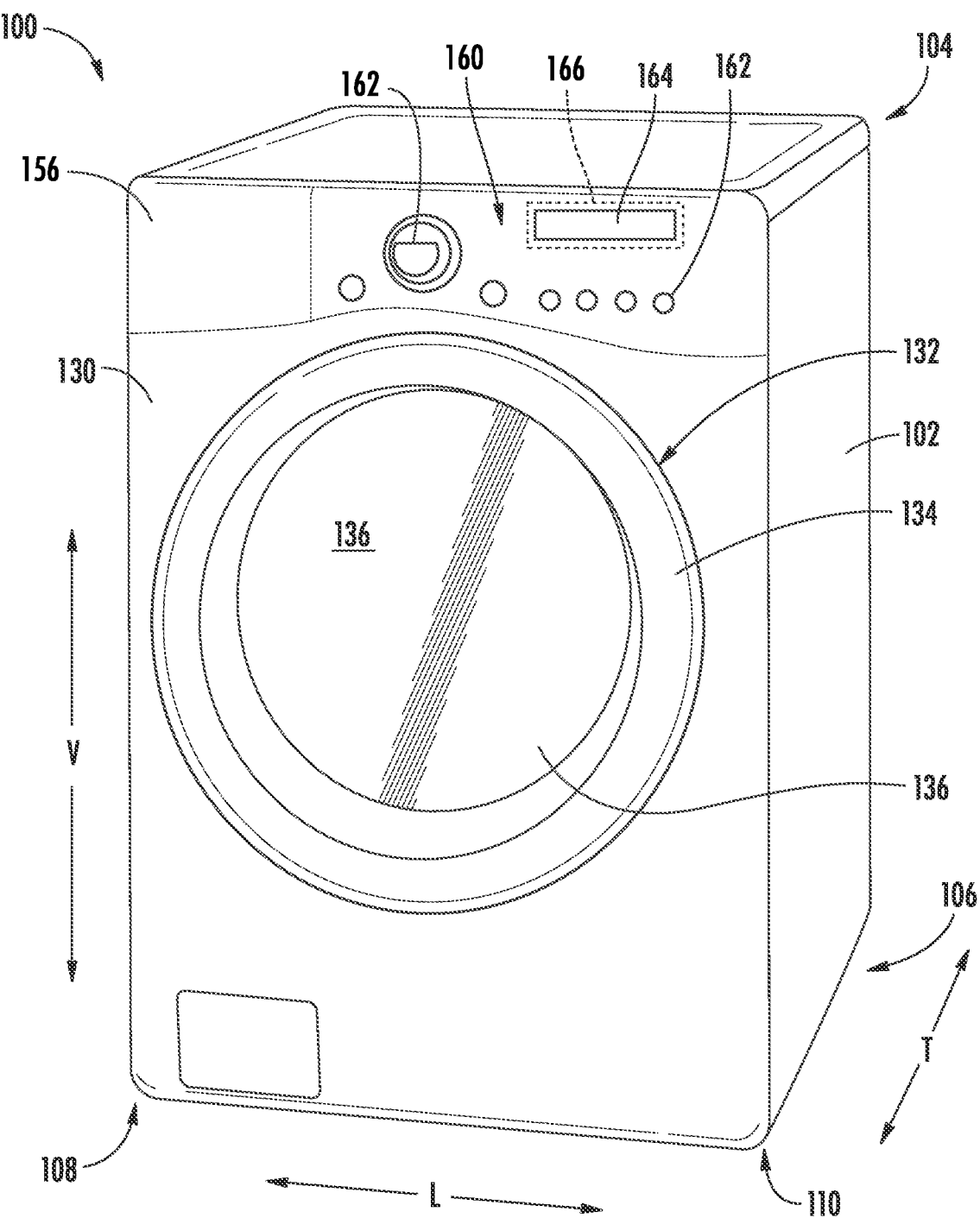
FIG. 1 provides a perspective view of an exemplary washing machine appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
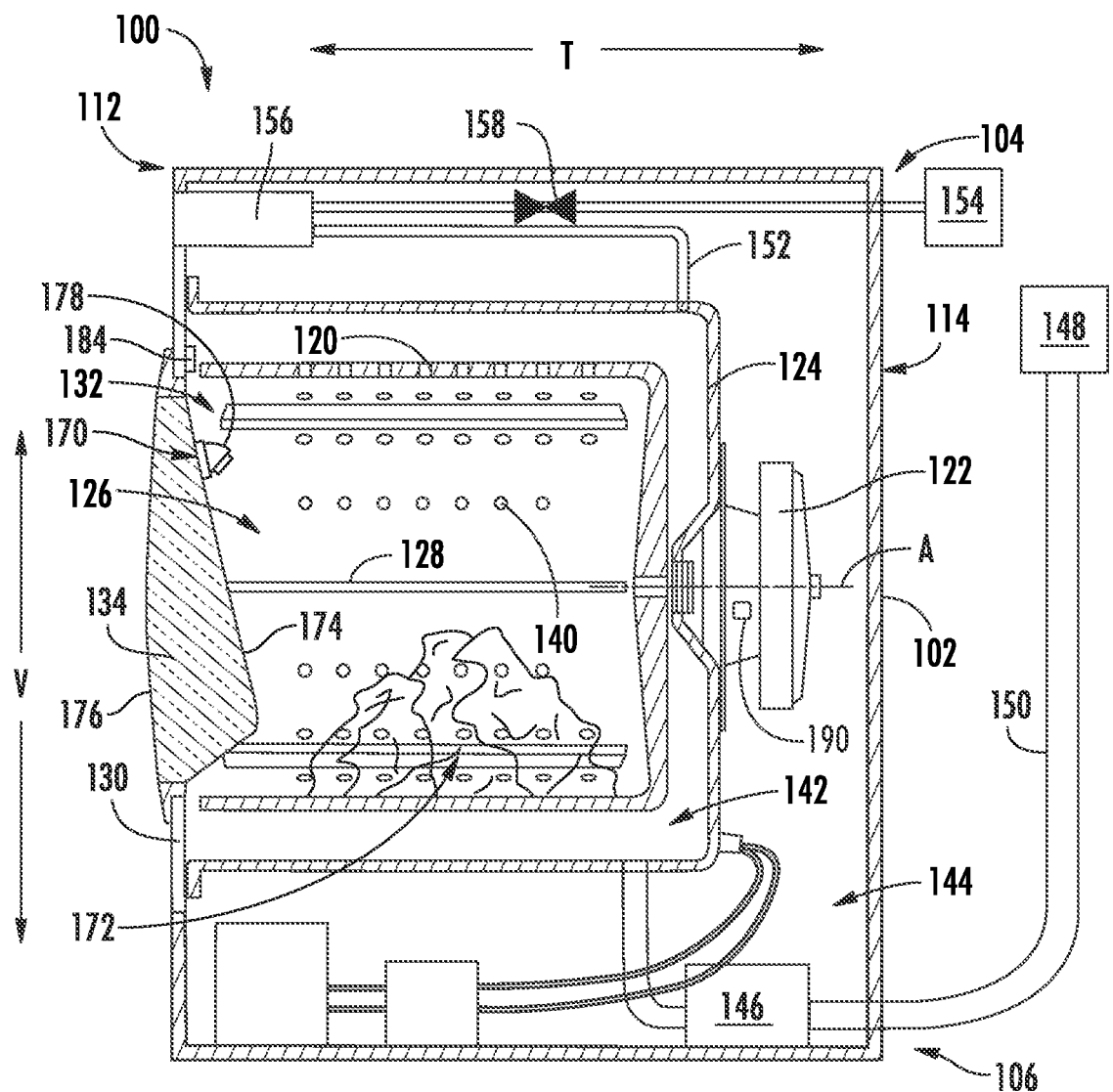
FIG. 2 provides a side cross-sectional view of the exemplary washing machine appliance of FIG. 1.

Referring now to the figures, an exemplary laundry appliance that may be used to implement aspects of the present subject matter will be described. Specifically, FIG. 1 is a perspective view of an exemplary horizontal axis washing machine appliance 100 and FIG. 2 is a side cross-sectional view of washing machine appliance 100. As illustrated, washing machine appliance 100 generally defines a vertical direction V, a lateral direction L, and a transverse direction T, each of which is mutually perpendicular, such that an orthogonal coordinate system is generally defined. Washing machine appliance 100 includes a cabinet 102 that extends between a top 104 and a bottom 106 along the vertical direction V, between a left side 108 and a right side 110 along the lateral direction, and between a front 112 and a rear 114 along the transverse direction T.

Referring to FIG. 2, a wash basket 120 is rotatably mounted within cabinet 102 such that it is rotatable about an axis of rotation A. A motor 122, e.g., such as a pancake motor, is in mechanical communication with wash basket 120 to selectively rotate wash basket 120 (e.g., during an agitation or a rinse cycle of washing machine appliance 100). Wash basket 120 is received within a wash tub 124 and defines a wash chamber 126 that is configured for receipt of articles for washing. The wash tub 124 holds wash and rinse fluids for agitation in wash basket 120 within wash tub 124. As used herein, "wash fluid" may refer to water, detergent, fabric softener, bleach, or any other suitable wash additive or combination thereof. Indeed, for simplicity of discussion, these terms may all be used interchangeably herein without limiting the present subject matter to any particular "wash fluid."

Wash basket 120 may define one or more agitator features that extend into wash chamber 126 to assist in agitation and cleaning articles disposed within wash chamber 126 during operation of washing machine appliance 100. For example, as illustrated in FIG. 2, a plurality of ribs 128 extends from basket 120 into wash chamber 126. In this manner, for example, ribs 128 may lift articles disposed in wash basket 120 during rotation of wash basket 120.

Referring generally to FIGS. 1 and 2, cabinet 102 also includes a front panel 130 which defines an opening 132 that permits user access to wash basket 120 of wash tub 124. More specifically, washing machine appliance 100 includes a door 134 that is positioned over opening 132 and is rotatably mounted to front panel 130. In this manner, door 134 permits selective access to opening 132 by being movable between an open position (not shown) facilitating access to a wash tub 124 and a closed position (FIG. 1) prohibiting access to wash tub 124.

A window 136 in door 134 permits viewing of wash basket 120 when door 134 is in the closed position, e.g., during operation of washing machine appliance 100. Door 134 also includes a handle (not shown) that, e.g., a user may pull when opening and closing door 134. Further, although door 134 is illustrated as mounted to front panel 130, it should be appreciated that door 134 may be mounted to another side of cabinet 102 or any other suitable support according to alternative embodiments.

Referring again to FIG. 2, wash basket 120 also defines a plurality of perforations 140 in order to facilitate fluid communication between an interior of basket 120 and wash tub 124. A sump 142 is defined by wash tub 124 at a bottom of wash tub 124 along the vertical direction V. Thus, sump 142 is configured for receipt of and generally collects wash fluid during operation of washing machine appliance 100. For example, during operation of washing machine appliance 100, wash fluid may be urged by gravity from basket 120 to sump 142 through plurality of perforations 140.

A drain pump assembly 144 is located beneath wash tub 124 and is in fluid communication with sump 142 for periodically discharging soiled wash fluid from washing machine appliance 100. Drain pump assembly 144 may generally include a drain pump 146 which is in fluid communication with sump 142 and with an external drain 148 through a drain hose 150. During a drain cycle, drain pump 146 urges a flow of wash fluid from sump 142, through drain hose 150, and to external drain 148. More specifically, drain pump 146 includes a motor (not shown) which is energized during a drain cycle such that drain pump 146 draws wash fluid from sump 142 and urges it through drain hose 150 to external drain 148.

A spout 152 is configured for directing a flow of fluid into wash tub 124. For example, spout 152 may be in fluid communication with a water supply 154 (FIG. 2) in order to direct fluid (e.g., clean water or wash fluid) into wash tub 124. Spout 152 may also be in fluid communication with the sump 142. For example, pump assembly 144 may direct wash fluid disposed in sump 142 to spout 152 in order to circulate wash fluid in wash tub 124.

As illustrated in FIG. 2, a detergent drawer 156 is slidably mounted within front panel 130. Detergent drawer 156 receives a wash additive (e.g., detergent, fabric softener, bleach, or any other suitable liquid or powder) and directs the fluid additive to wash tub 124 during operation of washing machine appliance 100. According to the illustrated embodiment, detergent drawer 156 may also be fluidly coupled to spout 152 to facilitate the complete and accurate dispensing of wash additive. It should be appreciated that according to alternative embodiments, these wash additives could be dispensed automatically via a bulk dispensing unit (not shown). Other systems and methods for providing wash additives are possible and within the scope of the present subject matter.

In addition, a water supply valve 158 may provide a flow of water from a water supply source (such as a municipal water supply 154) into detergent dispenser 156 and into wash tub 124. In this manner, water supply valve 158 may generally be operable to supply water into detergent dispenser 156 to generate a wash fluid, e.g., for use in a wash cycle, or a flow of fresh water, e.g., for a rinse cycle. It should be appreciated that water supply valve 158 may be positioned at any other suitable location within cabinet 102. In addition, although water supply valve 158 is described herein as regulating the flow of "wash fluid," it should be appreciated that this term includes, water, detergent, other additives, or some mixture thereof.

A control panel 160 including a plurality of input selectors 162 is coupled to front panel 130. Control panel 160 and input selectors 162 collectively form a user interface input for operator selection of machine cycles and features. For example, in one embodiment, a display 164 indicates selected features, a countdown timer, and/or other items of interest to machine users. Operation of washing machine appliance 100 is controlled by a controller or processing device 166 (FIG. 1) that is operatively coupled to control panel 160 for user manipulation to select washing machine cycles and features. In response to user manipulation of control panel 160, controller 166 operates the various components of washing machine appliance 100 to execute selected machine cycles and features.

Controller 166 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 166 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 160 and other components of washing machine appliance 100 may be in communication with controller 166 via one or more signal lines or shared communication busses.

During operation of washing machine appliance 100, laundry items are loaded into wash basket 120 through opening 132, and washing operation is initiated through operator manipulation of input selectors 162. Wash tub 124 is filled with water, detergent, and/or other fluid additives, e.g., via spout 152 and/or detergent drawer 156. One or more valves (e.g., water supply valve 158) can be controlled by washing machine appliance 100 to provide for filling wash basket 120 to the appropriate level for the amount of articles being washed and/or rinsed. By way of example for a wash mode, once wash basket 120 is properly filled with fluid, the contents of wash basket 120 can be agitated (e.g., with ribs 128) for washing of laundry items in wash basket 120.

After the agitation phase of the wash cycle is completed, wash tub 124 can be drained. Laundry articles can then be rinsed by again adding fluid to wash tub 124, depending on the particulars of the cleaning cycle selected by a user. Ribs 128 may again provide agitation within wash basket 120. One or more spin cycles may also be used. In particular, a spin cycle may be applied after the wash cycle and/or after the rinse cycle in order to wring wash fluid from the articles being washed. During a final spin cycle, basket 120 is rotated at relatively high speeds and drain assembly 144 may discharge wash fluid from sump 142. After articles disposed in wash basket 120 are cleaned, washed, and/or rinsed, the user can remove the articles from wash basket 120, e.g., by opening door 134 and reaching into wash basket 120 through opening 132.

Figure 3:
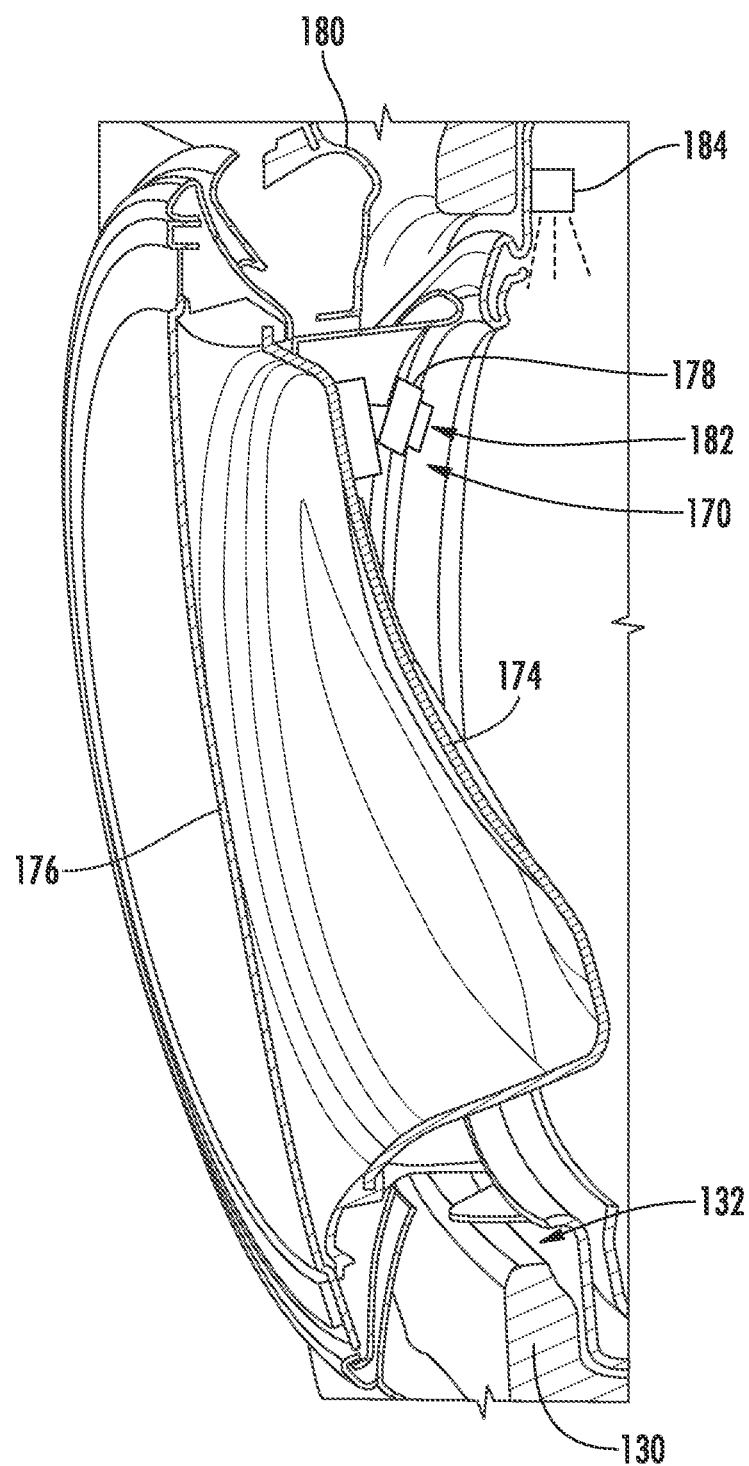
FIG. 3 provides a cross-sectional view of the exemplary washing machine appliance of FIG. 1 with a camera assembly mounted on a door according to an exemplary embodiment of the present subject matter.

Referring now specifically to FIGS. 2 and 3, washing machine appliance 100 may further include a camera assembly 170 that is generally positioned and configured for obtaining images of a load of clothes (e.g., as identified schematically by reference numeral 172) within wash chamber 126 of washing machine appliance 100. Specifically, according to the illustrated embodiment, door 134 of washing machine appliance 100 comprises and inner window 174 that partially defines wash chamber 126 and an outer window 176 that is exposed to the ambient environment. According to the illustrated exemplary embodiment, camera assembly 170 includes a camera 178 that is mounted to inner window 174. Specifically, camera 178 is mounted such that is faces toward a bottom side of wash tub 124. In this manner, camera 178 can take images or video of an inside of wash chamber 126 and remains unobstructed by windows that may obscure or distort such images.

Figure 4:
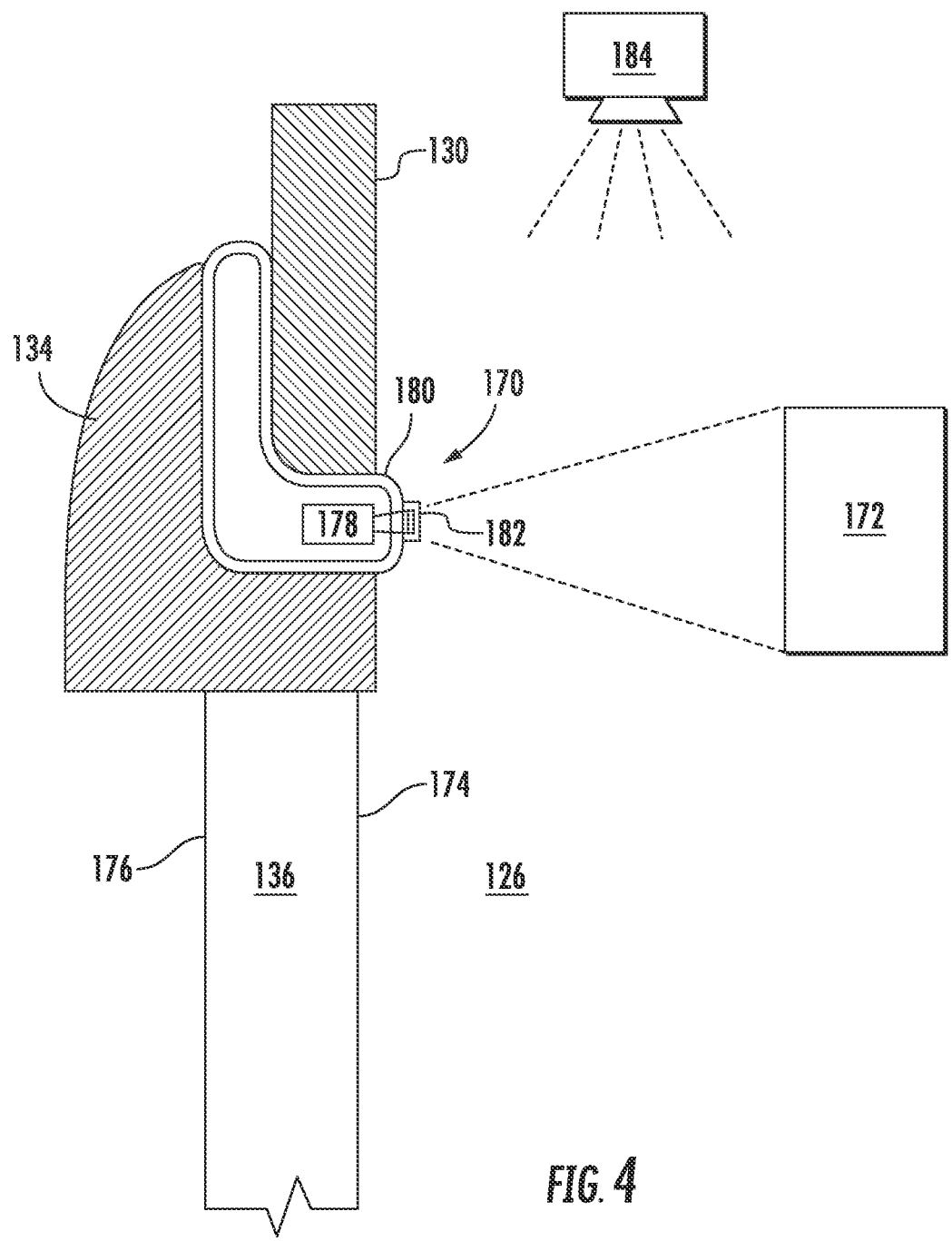
FIG. 4 provides a schematic view of a door and gasket sealed against a cabinet of the exemplary washing machine of FIG. 1, along with a camera mounted within the gasket according to an exemplary embodiment of the present subject matter.

Referring now briefly to FIG. 4, another installation of camera assembly 170 will be described according to an exemplary embodiment of the present subject matter. Due to the similarity between this and other embodiments, like reference numerals may be used to refer to the same or similar features. According to this exemplary embodiment, camera assembly 170 is mounted within a gasket 180 that is positioned between a front panel 130 of cabinet 102 and door 134. Although exemplary camera assemblies 170 are illustrated and described herein, it should be appreciated that according to alternative embodiments, washing machine appliance 100 may include any other camera or system of imaging devices for obtaining images of the load of clothes 172.

It should be appreciated that camera assembly 170 may include any suitable number, type, size, and configuration of camera(s) 178 for obtaining images of wash chamber 126. In general, cameras 178 may include a lens 182 that is constructed from a clear hydrophobic material or which may otherwise be positioned behind a hydrophobic clear lens. So positioned, camera assembly 170 may obtain one or more images or videos of clothes 172 within wash chamber 126, as described in more detail below. Referring still to FIGS. 2 through 4, washing machine appliance 100 may further include a tub light 184 that is positioned within cabinet 102 or wash chamber 126 for selectively illuminating wash chamber 126 and the load of clothes 172 positioned therein.

According to exemplary embodiments of the present subject matter, washing machine appliance 100 may further include a basket speed sensor 190 (FIG. 2) that is generally configured for determining a basket speed of wash basket 120. In this regard, for example, basket speed sensor 190 may be an optical, tactile, or electromagnetic speed sensor that measures a motor shaft speed (e.g., such as a tachometer, hall-effect sensor, etc.). According to still other embodiments, basket speeds may be determined by measuring a motor frequency, a back electromotive force (EMF) on motor 122, or a motor shaft speed in any other suitable manner. Accordingly, it should be appreciated that according to exemplary embodiments, a physical basket speed sensor 190 is not needed, as electromotive force and motor frequency may be determined by controller 166 without needing a physical speed sensor. It should be appreciated that other systems and methods for monitoring basket speeds may be used while remaining within the scope of the present subject matter.

Notably, controller 166 of washing machine appliance 100 (or any other suitable dedicated controller) may be communicatively coupled to camera assembly 170, tub light 184, basket speed sensor 190, and other components of washing machine appliance 100. As explained in more detail below, controller 166 may be programmed or configured for analyzing the images obtained by camera assembly 170, e.g., in order to determine the load characteristics of clothes 172, the remaining moisture content ("RMC") of clothes 172, or other cycle information, and may use this information to make informed decisions regarding the operation of washing machine appliance 100.

While described in the context of a specific embodiment of horizontal axis washing machine appliance 100, using the teachings disclosed herein it will be understood that horizontal axis washing machine appliance 100 is provided by way of example only. Other washing machine appliances having different configurations, different appearances, and/or different features may also be utilized with the present subject matter as well, e.g., vertical axis washing machine appliances. In addition, aspects of the present subject matter may be utilized in a combination washer/dryer appliance. Indeed, it should be appreciated that aspects of the present subject matter may further apply to other laundry appliances, such a dryer appliance. In this regard, the same methods as systems and methods as described herein may be used to monitor a load of clothes in a chamber of the dryer.

Now that the construction of washing machine appliance 100 and the configuration of controller 166 according to exemplary embodiments have been presented, an exemplary method 200 of operating a washing machine appliance will be described. Although the discussion below refers to the exemplary method 200 of operating washing machine appliance 100, one skilled in the art will appreciate that the exemplary method 200 is applicable to the operation of a variety of other washing machine appliances, such as vertical axis washing machine appliances. In exemplary embodiments, the various method steps as disclosed herein may be performed by controller 166 or a separate, dedicated controller.

Figure 5:
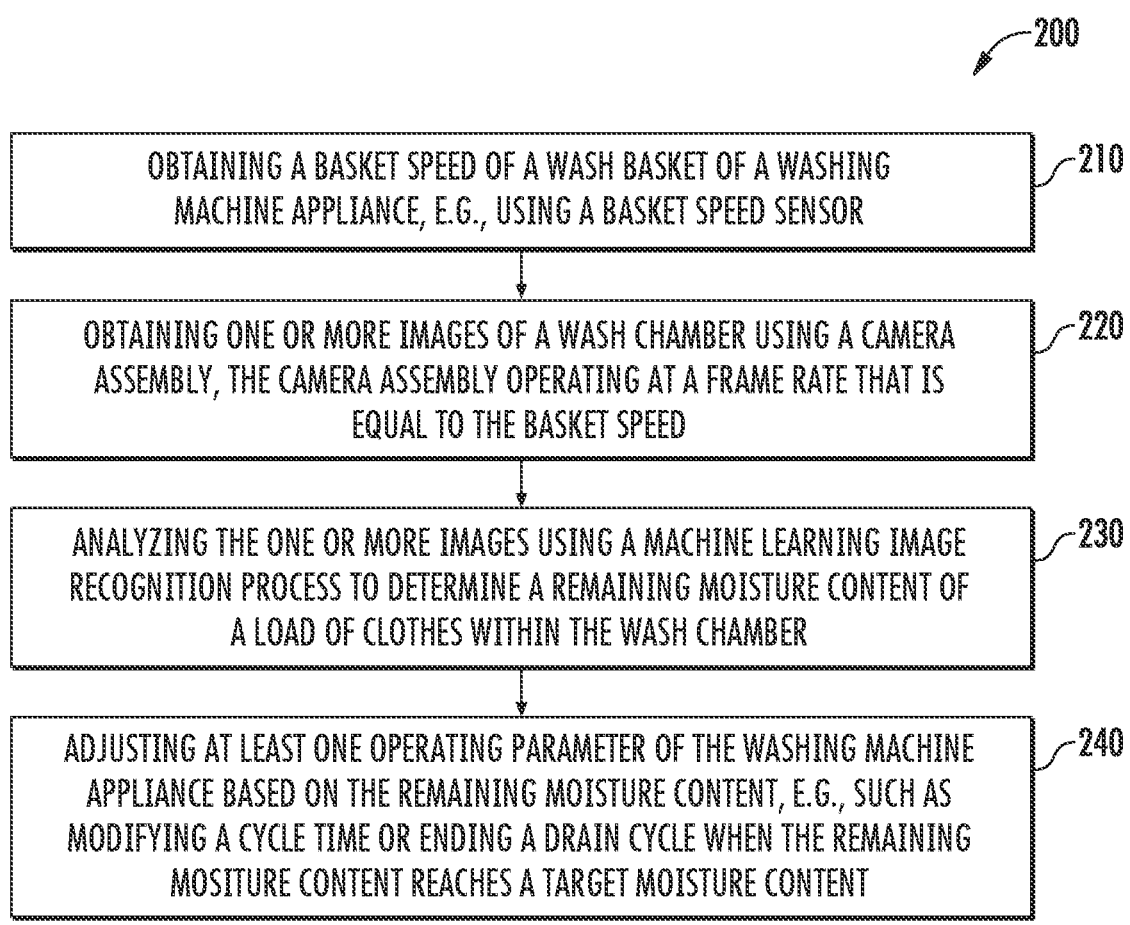
FIG. 5 illustrates a method for operating a washing machine appliance in accordance with one embodiment of the present disclosure.

Referring now to FIG. 5, method 200 includes, at step 210, obtaining a basket speed of the wash basket. In this regard, continuing example from above, basket speed sensor 190 may be used to monitor the speed of wash basket (e.g., in revolutions per minute). According still other embodiments, controller 166 may obtain the basket speed by analyzing the motor frequency, the back electromotive force experienced by the motor assembly, or in any other suitable manner. As explained in more detail below, the basket speed may be used according to exemplary embodiments to obtain a clearer image or images of the load of clothes 172 in wash chamber 126.

Step 220 includes obtaining one or more images of the wash chamber using the camera assembly. More specifically, according to exemplary embodiments of the present subject matter, a frame rate of camera assembly 170 may be set such that it is substantially equivalent to the basket speed (e.g., as determined at step 210). As used herein, the term "frame rate" and similar terms are intended generally to refer to the number of images taken by camera assembly 170 within a given time period. For example, the frame rate may be the number of individual frames obtained by camera assembly 170 within a single second, often referred to as frames per second (or "FPS"). Although the discussion herein refers to having a frame rate that is equivalent to the basket speed, it should be appreciated that absolute equivalence is not strictly necessary and that aspects of the present subject matter may be implemented with slight differences between the measured basket speed and the frame rate.

The present disclosure generally refers to maintaining a frame rate that is equivalent to the basket speed. However, it should be appreciated that any suitable conversions as to the measured variables in their frequency of capture may be used according to exemplary embodiments. Indeed, controller 166 and/or camera assembly 170 may generally be configured for making any suitable adjustment to the frame rate of camera assembly 170 such that it corresponds to the basket speed. Notably, when the frame rate and basket speed are synced in this manner, the resulting video or series of images has less distortion or blur and generally provides a better representation or snapshot of the load of clothes 172 within wash chamber 126. For example, this may be due to the fact that each frame captured by camera assembly 170 shows wash basket 120 at the same angular position.

Thus, step 220 includes obtaining a series of frames or a video of the load of clothes 172 within wash chamber 126. For example, camera assembly 170 may obtain a video clip of the wash basket while it is rotating at the basket speed and the frame rate of the video clip is taken at the basket speed. Step 220 may include taking a still image from the video clip or otherwise obtaining a still representation or photo from the video clip. It should be appreciated that the images obtained by camera assembly 170 may vary in number, frequency, angle, resolution, detail, etc. in order to improve the clarity of the load of clothes 172. In addition, according to exemplary embodiments, controller 166 may be configured for illuminating the tub using tub light 184 just prior to obtaining images.

Step 230 includes analyzing the one or more images using a machine learning image recognition process to determine a remaining moisture content of the load of clothes. As used herein, the term "remaining moisture content" and the like are generally intended to refer to any suitable representation of the amount of residual moisture within the load of clothes during or after a drain cycle. For example, the remaining moisture content may be quantified in terms of a percent of moisture relative to a saturated load of clothes. Thus, the remaining moisture content might be 100% at the end of the wash cycle and washing machine appliance 100 may perform a spin or drain cycle in order to reduce the remaining moisture content to a certain target threshold percentage suitable for transfer to a corresponding dryer appliance. It should be appreciated that the remaining moisture content may be an approximation or best fit representation of the amount of moisture on or within load of clothes 172. For example, controller 166 may be programmed with thresholds for determining whether a remaining moisture content level qualifies as wet, damp, dry, etc. According to still other embodiments, the remaining moisture content may be quantified in terms of total percentage, estimated volume of water or wash fluid, etc. For example, these remaining moisture content levels may be set by the user, preprogrammed by the manufacturer, or calculated in real time based on empirical data and known or estimated operating characteristics.

As used herein, the terms image recognition process, remaining moisture content detection, moisture analysis, and similar terms may be used generally to refer to any suitable method of observation, analysis, image decomposition, feature extraction, image classification, etc. of one or more image or videos taken within a wash chamber of a washing machine appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by camera assembly 170 and controller 166 may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as a particular garment or region of a load of clothes. In this regard, a "region proposal" may be regions in an image that could belong to a particular object, such as a particular article of clothing. A convolutional neural network is then used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like.

According to still other embodiments, the image recognition process may use any other suitable neural network process. For example, step 230 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to obtain a quantification of the remaining moisture content. In addition, a K-means algorithm may be used. Other image recognition processes are possible and within the scope of the present subject matter.

It should be appreciated that any other suitable image recognition process may be used while remaining within the scope of the present subject matter. For example, step 230 of analyzing the one or more images may include using a deep belief network ("DBN") image recognition process. A DBN image recognition process may generally include stacking many individual unsupervised networks that use each network's hidden layer as the input for the next layer. According to still other embodiments, step 220 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

According to exemplary embodiments of the present subject matter, the image analysis performed at step 230 may generally monitor any suitable qualitative or quantitative aspect of the load of clothes 172 or wash chamber 126 which might be indicative of the moisture content within a load of clothes. For example, the analysis may include the monitoring of at least one of a color tone, a volume, a weight, a garment type or types of load of clothes 172. In addition, or alternatively, the analysis may include or be based at least in part on inputs such as a cycle selection, sounds or vibrations generated during a spin cycle, etc.

Step 240 generally includes adjusting at least one operating parameter of the washing machine appliance based on the remaining moisture content. As used herein, an "operating parameter" of washing machine appliance 100 is any cycle setting, operating time, component setting, spin speed, part configuration, water level, water temperature, detergent volume, or other operating characteristic that may affect the performance of washing machine appliance 100. Thus, references to operating parameter adjustments or "adjusting at least one operating parameter" are intended to refer to control actions intended to improve system performance based on the remaining moisture content.

For example, controller 166 may be configured for obtaining a target moisture content, i.e., a desired remaining moisture content of the load of clothes 172 at the end of the spin cycle. Notably, this target moisture content may be selected such that the load of clothes has the desired amount of dampness, e.g., for minimizing energy usage while improving the performance of a corresponding dryer appliance, minimizing wrinkles, etc. Thus, for example, controller 166 may continually monitor the remaining moisture content of a load of clothes and may end the spin cycle when the target moisture content is reached. By contrast, controller 166 may periodically monitor the remaining moisture content and may modify a cycle time or duration, may adjust another suitable cycle parameter, or may make any other suitable adjustments. Other operating parameter adjustments are possible and within the scope of the present subject matter.

In addition, adjusting the at least one operating parameter may include providing a user notification, e.g., via a user interface or control panel 160, in the event that the remaining moisture content reaches the target moisture content or in the event that the remaining moisture content is not dropping as expected (e.g., which might indicate a mechanical or other operating failure). For example, if controller determines 166 that the remaining moisture content of a load of clothes has dropped to the target moisture content, step 240 may include ending the spin cycle and providing a user notification, e.g., via an indicator on control panel 160 or by communication with a remote device via a wireless communication protocol, such as Wi-Fi or Bluetooth.

FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using washing machine appliance 100 as an example, it should be appreciated that this method may be applied to the operation of any suitable washing machine appliance.

The systems and methods described herein provide for an intelligent spin cycle for a washer that utilizes artificial intelligence neural networks to determine remaining moisture content (RMC) level for a load. According to exemplary embodiments, a system controller may set a frame rate (e.g., in frames per second) of a video camera of the washer to be equal or substantially equivalent to a spin speed of the wash basket. In this manner, the camera may obtain what appear to be still images of the load of clothes within the spinning wash basket. These still images of the load may be analyzed during the cycle using neural networks to determine the moisture level present and modify the cycle time accordingly to ensure desired water extraction.

Advantageously, the present methods ensure an optimal spin cycle time for desired water extraction from a load. For example, the present methods compensate for situations where a load is spinning at a speed lower than the target spin speed, e.g., due to high out of balance (OOB) condition. Also, this method helps in avoiding wet loads and ensures proper water extraction. For mixed garment types in a load, the image may be divided into segments to isolate different types of garments in the image or regions of those particular garments. The spin cycle may then be tailored to ensure homogeneous load extraction.

Further, the neural network can be trained to classify the load based on RMC value using the still images captured by the camera when the load is spinning. This learning may be based on change in cloth color tone and volume to indicate the level of moisture present. For training the model, a dry weight of the load may initially be measured and then the load may be wetted and added to the wash basket. An image of the load may be captured at this point and may be marked at 100% RMC. Then, the load may be spun and during the spin cycle, images and the subsequent weight of the load at multiple points may be obtained. This helps to calculate RMC for every image using weight as an indicator for that image. In addition, the machine learning model can use multiple factors like color change, volume change, garment type, cycle selected, and vibration change to determine remaining moisture level and modify spin cycle to achieve target moisture content. Additionally, this method can also be used in dryers to ensure best drying performance and optimum energy use.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
   a wash tub positioned within a cabinet;
   a wash basket rotatably mounted within the wash tub and defining a wash chamber configured for receiving of a load of clothes;
   a camera assembly mounted within the cabinet in view of the wash chamber; and
   a controller operably coupled to the camera assembly, the controller being configured to:
      obtain a basket speed;
      obtain a plurality of images of the wash chamber using the camera assembly while the wash basket is rotating during a spin cycle, the camera assembly operating at a frame rate that is equal to the basket speed;
      analyze the plurality of images using a machine learning image recognition process to determine a remaining moisture content of the load of clothes, wherein analyzing the plurality of images comprises monitoring at least one of a color tone or a volume of the load of clothes; and
      adjust at least one operating parameter of the washing machine appliance based on the remaining moisture content.

2. The washing machine appliance of claim 1, wherein obtaining plurality of images comprises:
   obtaining a video clip of the wash basket while the wash basket is rotating at the basket speed, the frame rate of the video clip being equivalent to the basket speed; and
   obtaining a still image from the video clip.

3. The washing machine appliance of claim 1, wherein the controller is further configured to:
determine that the remaining moisture content is equal to a target moisture content.

4. The washing machine appliance of claim 1, wherein adjusting the at least one operating parameter comprises ending a drain cycle of the washing machine appliance.

5. The washing machine appliance of claim 1, wherein adjusting the at least one operating parameter comprises modifying a cycle time.

6. The washing machine appliance of claim 1, wherein the controller is further configured to:
   adjust the frame rate of the camera assembly to match the basket speed.

7. The washing machine appliance of claim 1, further comprising:
   a tub light for illuminating the wash chamber, wherein the controller is further configured to turn on the tub light prior to obtaining the plurality of images of the wash chamber.

8. The washing machine appliance of claim 1, wherein the machine learning image recognition process comprises at least one of a convolution neural network ("CNN"), a region-based convolution neural network ("R-CNN"), a deep belief network ("DBN"), or a deep neural network ("DNN") image recognition process.

9. The washing machine appliance of claim 1, wherein the washing machine appliance further comprises:
   a user interface panel, wherein the controller is further configured to provide a user notification when the remaining moisture content reaches a target remaining moisture content.

10. The washing machine appliance of claim 1, further comprising:
    a door rotatably mounted to the cabinet for providing selective access to the wash chamber; and
    a gasket positioned between wherein the door and the cabinet, wherein the camera assembly is mounted in the gasket.

11. The washing machine appliance of claim 1, further comprising:
    a door rotatably mounted to the cabinet for providing selective access to the wash chamber, wherein the camera assembly is mounted on an inner surface of the door.

12. The washing machine appliance of claim 1, further comprising:
    a basket speed sensor configured for monitoring the basket speed of the wash basket.

13. A method of operating a washing machine appliance, the washing machine appliance comprising a wash tub positioned within a cabinet, a wash basket rotatably mounted within the wash tub and defining a wash chamber configured for receiving of a load of clothes, and a camera assembly mounted within the cabinet in view of the wash chamber, the method comprising:
    obtaining a basket speed;
    obtaining plurality of images of the wash chamber using the camera assembly while the wash basket is rotating during a spin cycle, the camera assembly operating at a frame rate that is equal to the basket speed;
    analyzing the plurality of images using a machine learning image recognition process to determine a remaining moisture content of the load of clothes, wherein analyzing the plurality of images comprises monitoring at least one of a color tone or a volume of the load of clothes; and adjusting at least one operating parameter of the washing machine appliance based on the remaining moisture content.

14. The method of claim 13, wherein obtaining plurality of images comprises:
   obtaining a video clip of the wash basket while the wash basket is rotating at the basket speed, the frame rate of the video clip being equivalent to the basket speed; and
   obtaining a still image from the video clip.

15. The method of claim 13, further comprising:
   determining that the remaining moisture content is equal to a target moisture content, and wherein adjusting the at least one operating parameter comprises ending a drain cycle of the washing machine appliance.

16. The method of claim 13, wherein adjusting the at least one operating parameter comprises modifying a cycle time.

17. The method of claim 13, further comprising:
   adjusting the frame rate of the camera assembly to match the basket speed.

18. The method of claim 13, wherein the machine learning image recognition process comprises at least one of a convolution neural network ("CNN"), a region-based convolution neural network ("R-CNN"), a deep belief network ("DBN"), or a deep neural network ("DNN") image recognition process.

* * * * *